US010915915B1

(12) United States Patent
Lieberman et al.

(10) Patent No.: US 10,915,915 B1
(45) Date of Patent: Feb. 9, 2021

(54) SYSTEMS AND METHODS FOR IDENTIFYING FINANCIAL TRANSACTION OPPORTUNITIES FOR INDIVIDUALIZED OFFERS

(71) Applicant: JPMorgan Chase Bank, N.A., New York, NY (US)

(72) Inventors: Alex Lieberman, Marlboro, NJ (US); Nitin Bhargava, East Brunswick, NJ (US); Ryan Andrew Schlosser, New York, NY (US); Robert A. Stefan, Voorheesville, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 578 days.

(21) Appl. No.: 15/232,255

(22) Filed: Aug. 9, 2016

(51) Int. Cl.
*G06Q 30/02* (2012.01)
*G06Q 20/32* (2012.01)

(52) U.S. Cl.
CPC ..... *G06Q 30/0215* (2013.01); *G06Q 20/3224* (2013.01); *G06Q 30/0226* (2013.01)

(58) Field of Classification Search
None
See application file for complete search history.

(56) References Cited

U.S. PATENT DOCUMENTS

| 5,870,721 | A | 2/1999 | Norris |
| 5,940,811 | A | 8/1999 | Norris |
| 6,105,107 | A | 8/2000 | Ho et al. |
| 7,370,004 | B1 | 5/2008 | Patel et al. |
| 8,352,370 | B1 | 1/2013 | White et al. |
| 2011/0302079 | A1* | 12/2011 | Neuhaus ................ G06Q 20/10 705/39 |
| 2012/0221392 | A1* | 8/2012 | Baker ................ G06O 30/0207 705/14.17 |
| 2012/0286035 | A1* | 11/2012 | Walker ................ G07F 7/08 235/380 |

(Continued)

OTHER PUBLICATIONS

Y. Zhang, F. You and H. Liu, "Behavior-Based Credit Card Fraud Detecting Model," 2009 Fifth International Joint Conference on INC, IMS and IDC, Seoul, 2009, pp. 855-858, doi: 10.1109/NCM.2009.54. (Year: 2009).*

(Continued)

*Primary Examiner* — Sam Refai
*Assistant Examiner* — Rashida R Shorter
(74) *Attorney, Agent, or Firm* — Hunton Andrews Kurth LLP

(57) ABSTRACT

Systems and methods for identifying financial transaction opportunities for individualized offers are disclosed. In one embodiment a method for offering rewards to a customer of a financial institution may include (1) a server comprising at least one computer processor identifying a customer spending opportunity for a customer to use a financial instrument issued by a financial institution to conduct a transaction involving the customer spending opportunity; (2) the server determining an incentive to offer the customer for using the financial instrument issued by the financial institution to conduct the transaction involving the customer spending opportunity; and (3) the server communicating the incentive to an electronic device associated with the customer.

18 Claims, 3 Drawing Sheets

(56) References Cited

U.S. PATENT DOCUMENTS

| | | | | |
|---|---|---|---|---|
| 2012/0323669 | A1* | 12/2012 | Kohlmeier | G06Q 30/02 |
| | | | | 705/14.38 |
| 2012/0330744 | A1* | 12/2012 | Aissa | G06Q 30/0238 |
| | | | | 705/14.38 |
| 2014/0058815 | A1* | 2/2014 | Hiremath | G06Q 30/0215 |
| | | | | 705/14.17 |
| 2015/0302469 | A1* | 10/2015 | Billou | G06Q 30/0253 |
| | | | | 705/14.17 |
| 2016/0328698 | A1* | 11/2016 | Kumaraguruparan | ....................... |
| | | | | G06Q 20/227 |

OTHER PUBLICATIONS

U.S. Appl. No. 11/610,289, filed Dec. 2006, Szwalbenest.
U.S. Appl. No. 13/240,262, filed Sep. 2011, White et al.
U.S. Appl. No. 13/803,298, filed Mar. 2013, Campbell et al.
U.S. Appl. No. 14/816,300, filed Aug. 2015, Gantert et al.
U.S. Appl. No. 14/875,195, filed Oct. 2015, Goodrich et al.
U.S. Appl. No. 14/919,087, filed Oct. 2015, Goodrich et al.

* cited by examiner

SYSTEMS AND METHODS FOR IDENTIFYING FINANCIAL TRANSACTION OPPORTUNITIES FOR INDIVIDUALIZED OFFERS

BACKGROUND OF THE INVENTION

1. Field of the Invention

The present disclosure generally relates to systems and methods for identifying financial transaction opportunities for individualized offers.

2. Description of the Related Art

Credit card issuers often try to attract customer spending by rewarding the customer for using financial instruments that they issued. For example, certain issuers provide rewards for purchases with certain merchants, at certain times of year, etc.

SUMMARY OF THE INVENTION

Systems and methods for identifying financial transaction opportunities for individualized offers are disclosed. In one embodiment a method for offering rewards to a customer of a financial institution may include (1) a server comprising at least one computer processor identifying a customer spending opportunity for a customer to use a financial instrument issued by a financial institution to conduct a transaction involving the customer spending opportunity; (2) the server determining an incentive to offer the customer for using the financial instrument issued by the financial institution to conduct the transaction involving the customer spending opportunity; and (3) the server communicating the incentive to an electronic device associated with the customer.

In one embodiment, the server may identify the customer spending opportunity by receiving, from a merchant, a notification that the electronic device associated with the customer is present at a merchant location, and the incentive may be based on the customer conducting the transaction for a good or service offered for sale at the merchant location. The notification may also include a location of the customer within the merchant location, and the incentive may be based on the customer conducting the transaction for an item that is associated with the customer location within the merchant location.

In one embodiment, the server may identify the customer spending opportunity by receiving, from the electronic device, location information for the electronic device indicating that the electronic device is present at a merchant location, and the incentive may be based on the customer conducting the transaction for a good or service offered for sale at the merchant location.

In another embodiment, the server may identify the customer spending opportunity identifying an expected transaction for the customer that is not conducted with the financial institution's financial instrument, and the incentive may be based on the customer conducting the expected transaction.

In one embodiment, the expected transaction may be based on transactions conducted by other financial institution customers using financial instruments issued by the financial institution.

In one embodiment, the incentive may be specific to at least one of a merchant, a good or service, and a manufacturer.

In one embodiment, the method of may further include the server receiving, from the electronic device, acceptance of the incentive; the server confirming that the transaction involving the customer spending opportunity was conducted using the financial instrument; and the server applying the incentive to the transaction.

According to another embodiment, a system for offering rewards may include at least one merchant having a merchant location; at least one financial institution; and a back end comprising at least one computer processor, wherein the back end may identify a customer spending opportunity for a customer to use financial instrument issued by the financial institution to conduct a transaction involving the customer spending opportunity; determine an incentive to offer the customer for using the financial instrument issued by the financial institution to conduct the transaction involving the customer spending opportunity; and communicate the incentive to an electronic device associated with the customer to conduct the transaction involving the customer spending opportunity.

In one embodiment, the customer spending opportunity may be identified by the back end receiving, from a merchant, a notification that the electronic device associated with the customer is present at a merchant location, and the incentive may be based on the customer conducting the transaction for a good or service offered for sale at the merchant location.

In one embodiment, the merchant location may include at least one location determining device that detects the presence of the electronic device at the merchant location.

In one embodiment, the notification may also include a location of the customer within the merchant location, and the incentive is based on a type of a good or service associated with the customer location.

In one embodiment, the electronic device may include a location sensing device, and the back end identifies the customer spending opportunity by receiving location information for the electronic device indicating that the electronic device is present at a merchant location from the electronic device, and the incentive may be based on the customer conducting the transaction for a good or service offered for sale at the merchant location.

In one embodiment, the back end may identify an expected transaction for the customer that is not conducted with the financial institution's financial instrument, and the incentive may be based the customer conducting the expected transaction. The expected transaction may be based on transactions conducted by other financial institution customers using financial instruments issued by the financial institution.

In one embodiment, the incentive to offer the customer for using the financial instrument issued by the first financial institution to conduct the transaction may be specific to at least one of a merchant, a good or service, and a manufacturer.

In one embodiment, the back end may receive acceptance of the incentive from the electronic device, confirms that the transaction involving the customer spending opportunity was conducted using the financial instrument, and applies the incentive to the transaction.

In another embodiment, a method for offering rewards to a customer of a financial institution may include (1) a server comprising retrieving, from a database, a plurality of transactions for goods and services conducted by a customer using a financial instrument issued by a financial institution over a first time period; (2) the server identifying an expected transaction involving a good or service for the customer during the time period; (3) the server determining that the plurality of transactions does not include the expected transaction; (4) the server determining an incentive to offer the customer to use the financial instrument to conduct the expected transaction; (5) the server communicating the incentive to an electronic device associated with the customer; (6) the server receiving a transaction for the expected transaction; and (7) the server applying the incentive to an account associated with the financial instrument.

In one embodiment, the expected transaction may be based on at least one of a customer age and a customer income.

In another embodiment, the expected transaction may be determined based on a transaction conducted with a financial instrument that is issued by a financial institution other than the financial institution.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
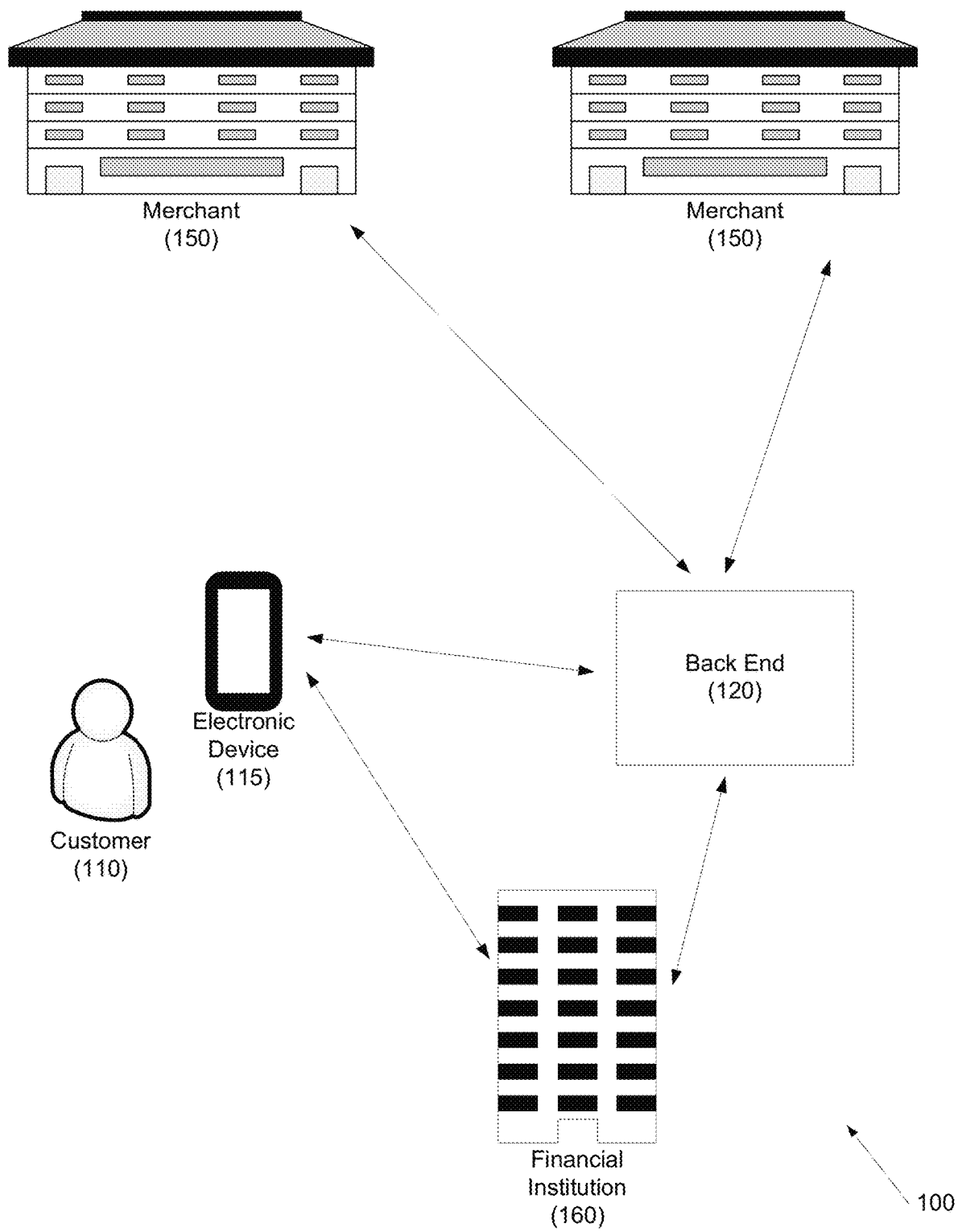
FIG. 1 depicts a system for identifying financial transaction opportunities for individualized offers according to one embodiment.
Figure 2:
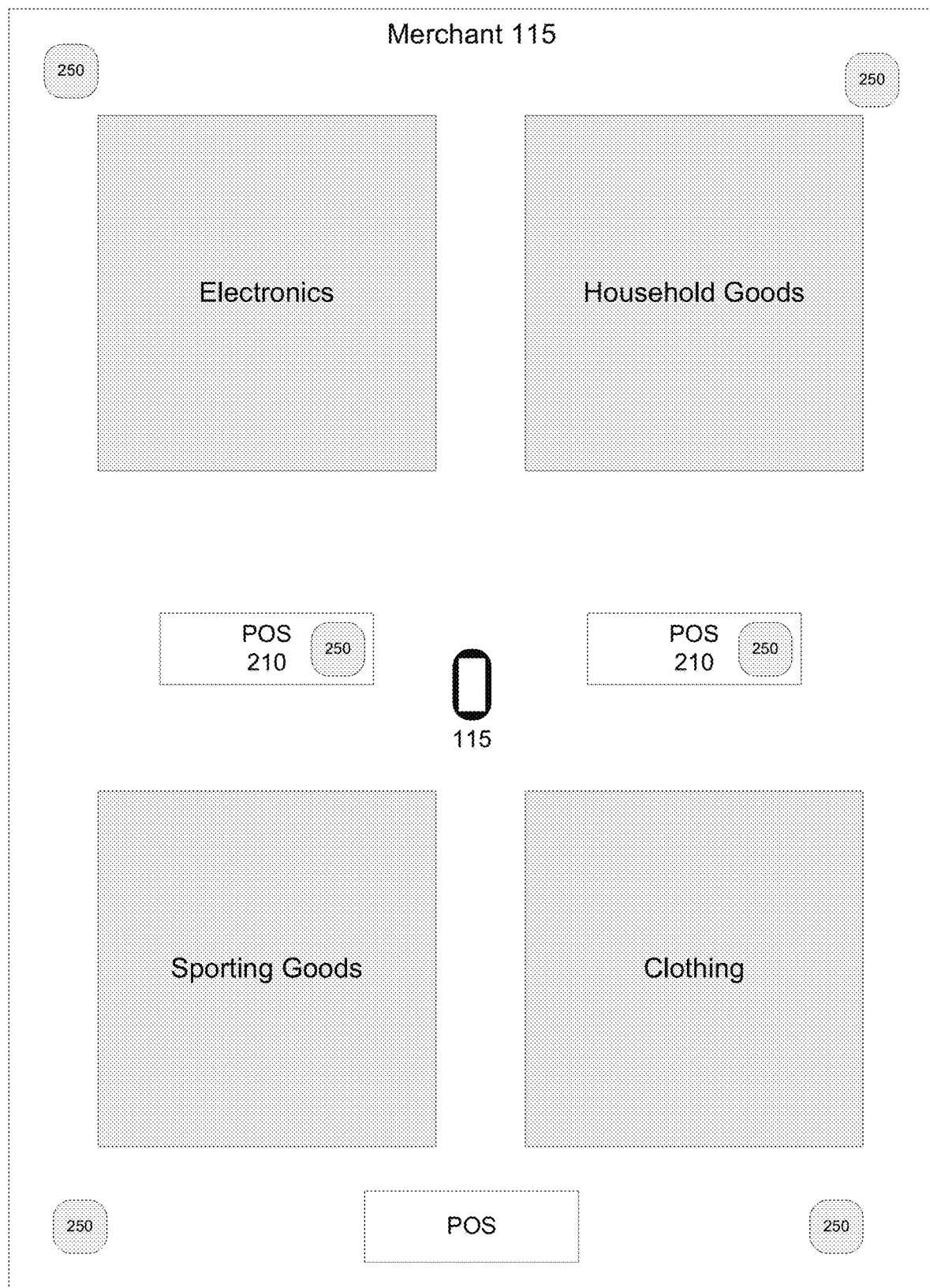
FIG. 2 depicts an example of a merchant location including beacons.
Figure 3:
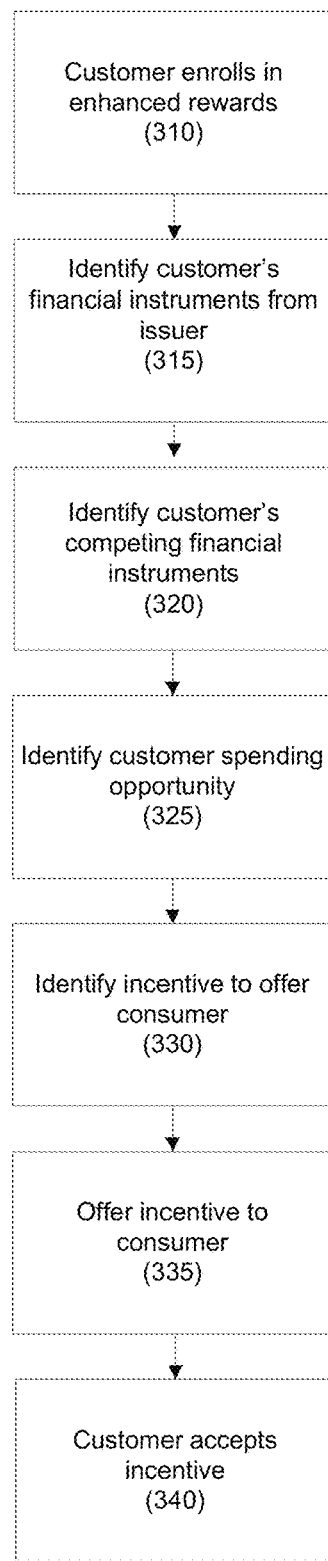
FIG. 3 depicts a method for identifying financial transaction opportunities for individualized offers according to one embodiment.

Several embodiments of the present invention and their advantages may be understood by referring to FIGS. 1-3.

Embodiments are directed to providing personalized incentives to customer to use an issuer's financial instrument to conduct a transaction. For example, a customer's spending patterns (or lack thereof), location, etc. may be used to identify whether a transaction is likely to be made, whether the customer is likely to use a competitor's financial instrument, and/or whether the customer should be offered an incentive (e.g., increased rewards, discounts, etc.) to conduct the transaction using the issuer's financial instrument. The issuer may also recommend a financial instrument that may provide the customer with greater rewards than the customer's current financial instrument to the customer.

In one embodiment, rewards may be personalized to an individual instead of to a broader market (e.g., all cardholders of a certain card), and may be transaction-based. Thresholds may be set for transactions to offer higher rewards (e.g., a minimum spending amount may be required to receive an additional reward). In embodiments, additional rewards may be identified based on regions/locations, categories, demographics, spending patterns, etc. to provide additional rewards to the customer.

In one embodiment, as a result of increased transactions involving the issuer's financial instruments, additional revenue may be generated for the issuer. For example, the issuer may receive additional revenue from fees on larger or preferred transactions.

In one embodiment, customers may opt in to the program by providing financial transaction account information to, for example, a credit card issuer. This may be done, for example, using a portal. In one embodiment, the customer may provide credit card information. In another embodiment, the customer may authorize credit card information to be shared from an electronic wallet. In still another embodiment, the credit card information may be received from an aggregator.

In one embodiment, financial instrument information may be received from credit reports, from bill payments (e.g., payment of credit card accounts with other issuers from bill pay accounts, etc.).

In one embodiment, the back end may authorize the financial instruments/accounts in order to confirm that the instruments/accounts are valid.

In one embodiment, the back-end may maintain a database of financial instruments, reward levels, etc. for itself and its competitors. In one embodiment, this may include financial instruments issued by a particular financial institution, from other financial institutions (e.g., competitors), etc.

In one embodiment, if the back-end is hosted by a third party, the back-end may maintain information on financial instruments from multiple issuers.

In one embodiment, the back-end may identify the customer's usage of a competitor's financial instruments. For example, the back-end may identify such usage from, for example, on-line bill payments, e-bills, etc. involving other issuers, etc.

In one embodiment, the back-end may infer potential usage of a competitor's financial instrument by tracking customer activity. For example, using GPS or other location determining technology, the back-end may determine that a customer is spending time at a particular merchant, but no transaction data involving the issuer's financial instrument is received. This may indicate that, if a transaction did occur, the transaction involved a competitor's financial instrument.

Other relationships, such as reward card partnerships, merchant partnerships, merchant processing partnerships, etc. may also be used to identify and/or infer potential usage of a competitor's financial instrument. For example, if a financial institution hosting the back-end has a relationship with a merchant (e.g., partnership, etc.), the merchant may provide information on transactions conducted with a competitor's financial instrument to the back-end.

In another embodiment, the back-end may infer potential usage of a competitor's financial instrument based on a lack of transactions received in certain categories in which transactions are likely or expected. For example, the back-end may not receive any transactions from a customer for groceries, fuel purchases, with a particular merchant, etc. This may indicate that the customer is using a competitor's financial instrument to conduct transactions in those categories.

In one embodiment, the back-end may identify spending habits and lacks of spending with a certain financial institution. For example, machine learning may be used to identify spending patterns, gaps in spending, etc. This may also indicate that the customer is using a competitor's financial instrument to conduct transactions in those categories.

In one embodiment, lack of spending may also indicate a change in spending habits even if a competitor's product is not used. Thus, targeted rewards may be provided to encourage spending in a category, at a merchant, etc.

The back-end may provide pre-purchase notifications and adjustments of rewards. For example, the back-end may monitor the time that a customer spends in a store, in an area of store, etc. using GPS, beacons, or any other suitable location determining technology to determine when and what type of additional reward to offer a customer. For example, after a customer spends a certain amount of time in an electronics section, the back-end may push an additional reward to the customer for the purchase of any electronic item from the merchant, for a specific item from the merchant, for an item from a different merchant with which the financial institution has a relationship, etc.

In one embodiment, customers may opt-in to additional rewards in certain categories.

In one embodiment, machine learning may be used to identify patterns of spending and gaps of spending.

Referring to FIG. 1, a system for identifying financial transaction opportunities for individualized offers is disclosed according to one embodiment. System 100 may include customer 110 with electronic device 115, one or more merchant 150, back end 120, and one or more financial institution 160.

In one embodiment, merchant 150 may be any suitable provider of goods or services. In one embodiment, merchant 150 may be a brick-and-mortar merchant. In another embodiment, merchant 150 may provide on-line portal. In still another embodiment, merchant 150's online portal may be accessed through a portal provided by a financial institution.

Referring to FIG. 2, merchant 150 may include one or more beacons 220 or other suitable location sensing technology that may be used in conjunction with electronic device 115 to locate customer 110. Any suitable beacon 220 may be used, including RF beacons, GPS beacons, IR beacons, NFC beacons from point of sale devices, etc. In one embodiment, sonic beacons may be used to identify the presence of a customer using inaudible and/or audible sounds.

For example, referring to FIG. 2, an illustrative schematic of a merchant using beacons is provided. Merchant 115 may include one or more departments/groupings of goods (e.g., electronics, household goods, sporting goods, clothing, etc.), services (e.g., equipment repair, rentals. etc.). Other examples could be groupings of goods, such as televisions, computers, telephones, etc. It should be recognized that these departments/groupings are illustrative only, and any suitable department or groupings of goods or services may be used as necessary and/or desired.

Merchant 115 may include one or more point of sale devices 210 such as a register, terminal, kiosk, etc.

One or more beacon 220 may be provided. In one embodiment, beacon 220 may be provided in any suitable location. In one embodiment, beacon 220 may be incorporated into POS 210.

In one embodiment, beacon 220 may emit and/or receive RF, IR, or sound (both audible and inaudible) energy.

For example, an application executed by a mobile electronic device may receive a plurality of inaudible sounds that may be produced by one or more beacons 220 at known locations and may determine a distance from each known location. Triangulation may be used to determine the location of electronic device 115.

In one embodiment, each sound source may be assigned an inaudible sound frequency, duration, phase, etc. in order for the distance between the sound source and electronic device 115 to be determined.

In another embodiment, electronic device 115 may be the source of an inaudible sound or RF transmission that may be received by one or more beacons 220 at known locations that may be used to determine a location of electronic device 115. For example, beacon 220 at point of sale device 210 may receive the RF transmission and/or inaudible sound from electronic device 115 to identify the presence of electronic device 115. As another example, a plurality of beacons 220 at known locations may receive the RF transmission and/or inaudible sound from electronic device 115 and determine the location of electronic device 115.

Combinations of different types of beacons (e.g., RF, inaudible, etc.) and techniques (e.g., electronic device 115 receives the transmission, electronic device 115 makes the transmission, etc.) may be used as necessary and/or desired.

Examples of beacons and other location sensing devices are disclosed in U.S. patent Ser. Nos. 14/816,300; 14/875,195; and 14/919,087. The disclosures of each of these documents is hereby incorporated, by reference, in its entirety.

In one embodiment, electronic device 115 may provide location information to back-end 120. This may be done by GPS or any other suitable location determining technology.

In one embodiment, a beacon back-end (not shown) and/or back-end 120 may access a database that identifies the location of products available at a merchant relative to the location of the beacons. Thus, based on the location of the customer from one or more beacon 220, the products in the area of the customer may be identified.

In one embodiment, financial institution 160 may communicate with back end 120. In one embodiment, financial institution 160 may communicate with electronic device 115 using, for example, a mobile application, a mobile website, a payment application, etc.

In one embodiment, financial institution 160 may issue one or more financial instruments (not shown) to customer 110.

In one embodiment, financial institution 160 may communicate with merchant 150.

Referring again to FIG. 1, electronic device 120 may execute mobile applications (not shown), such as a mobile banking application (e.g., provided by a financial institution such as a credit card issuer), a mobile wallet/payment application, etc. In one embodiment, one or more mobile application may communicate with back-end 120.

Back-end 120 may be hosted by a financial institution such as a credit card issuer, an aggregator, or a third party. In one embodiment, back-end may maintain or access information regarding credit cards and other financial instruments that may be carried by customer 110, customer 110 credit information, merchant 150 information, offers, etc.

Referring to FIG. 3, a method for identifying financial transaction opportunities for individualized offers is disclosed according to one embodiment.

In step 310, a customer of a financial institution may enroll in an enhanced rewards program. The customer may enroll with a financial institution with which the customer has an account, an entity associated with the financial institution, an aggregator, a third party, or any combination of these entities.

In one embodiment, as part of the enrollment, the customer may authorize sharing location data, transaction data, etc. with the entity. In one embodiment, the customer may share information regarding transactions that were conducted with financial instruments issued by other financial institutions.

In one embodiment, participating merchants may also share information with the entity, including transaction data, location data, etc.

In step 315, the entity may identify the customer's financial instruments. In one embodiment, if the entity is the issuer of the financial instrument, the identification may involve accessing the customer's records. If the financial instruments are issued by a different financial institution, or if the entity is an aggregator or third party, the entity may request such information from the customer, aggregator, etc.

In one embodiment, a customer's financial instruments may be identified from a customer's digital wallet, from on-line bill payments to other credit card issuers, etc.

In step 320, if not already done in step 315, the customer's competing financial instruments—financial instruments that the entity does not have access to—may be identified. As discussed above, this may involve the customer providing that information to the entity.

In step 325, the entity may identify a customer spending opportunity. For example, the entity may determine that the customer is at a merchant location based on a GPS location of the customer's mobile device, a report from the merchant, customer self-reporting, etc. Any suitable manner of identifying a customer spending opportunity may be used as is necessary and/or desired.

In another embodiment, a customer spending opportunity may be identified based on spending habits. For example, if a customer routinely gets coffee in the morning, the entity may expect this behavior. In one embodiment, if the entity does not receive a transaction associated with an expected behavior, this may indicate that the customer no longer has that behavior (e.g., no longer gets coffee in the morning) or that the customer is using a different financial instrument to conduct the transaction associated with that behavior. Thus, the entity may identify this as a customer spending opportunity.

Additional expected behaviors may include purchasing fuel, taking public transportation, purchasing house/cleaning supplies, spending money on entertainment, buying groceries, etc. In one embodiment, the expected behaviors may be based on past customer transactions. In one embodiment, the spending patterns may be useful to identify items with which the customer is familiar.

In one embodiment, the time that a customer spends in a store, or in a particular area of a store, may be indicative of a customer spending opportunity. The time may be monitored using, for example, beacons (e.g., RF, audible, etc.), GPS, customer self-reporting, mobile application reporting, etc.

In one embodiment, a customer spending opportunity may be determined from the customer approaching a checkout. For example, the customer's mobile device may communicate with a beacon, a point of sale device, etc., which may inform the entity that the customer is about to make a purchase. The type of purchase may be estimated from other customer behavior (e.g., time spent in certain parts of the store, etc.).

In one embodiment, customer spending opportunities may be identified based on items that are sensed to be placed in a shopping cart (both physical and on-line), by items scanned or imaged using the customer's electronic device, etc. In another embodiment, a merchant may have staff identify customers exhibiting an intent to purchase, and may send a report of this behavior to the back end if the customer is identified (e.g., by coming within range of a beacon or other identification mechanism, or being otherwise identified).

For example, the staff may carry beacon devices, and once a beacon or other transmission is received from the customer's electronic device, the beacon device may launch a GUI that may identify the customer and/or report the intent to purchase to the back end.

In one embodiment, a queuing line at the point of sale may be provided with a beacon, receiver, etc. that may be used to identify the customer.

In one embodiment, the customer may be identified based on traffic on the customer's electronic device through, for example, browser cookies, awareness of applications installed, combinations thereof, etc. Push notifications may be used to assist in awareness of competition of a transaction using a competitor's financial instrument in that a customer conducting a transaction using competitor's financial instrument may receive a push notification from that financial institution, from a mobile wallet, etc. This notification may be used to identify completion of a transaction.

In another embodiment, a customer spending opportunity may be detected if a customer leaves a merchant location without the use of the financial institution's financial instrument being used. The customer may be offered an incentive to go back to the merchant's location to make a purchase, or may be sent a communication to determine whether the customer made a purchase, and what financial instrument was used in order to present future offers to the customer.

In another embodiment, the customer's online activity may be used to identify a customer spending opportunity. For example, customer in-store searches for products (e.g., reviews, pricing, availability, etc.), online searches for a product while not physically present at a store may be indicative of a customer spending opportunity.

In step 330, an incentive may be identified for the customer based on the customer spending opportunity. In one embodiment, the incentive may be personalized for the customer—for example, it may be specific to the merchant at which the customer is currently located, it may be based on a behavior (e.g., active behavior and former behavior), it may be based on an expected behavior, etc.

In one embodiment, the incentive may be any suitable incentive. For example, the incentive may be a discount, enhanced rewards, reduced/no interest rates, installment payments, etc.

In one embodiment, the incentive may include an offer for a financial instrument that may offer greater rewards than the customer's current financial instrument, and may include an offer for "instant" credit.

Examples of instant credit are disclosed in U.S. Pat. Nos. 5,870,721; 5,940,811; 6,105,107; and 7,370,004, and 8,352,370, as well as U.S. patent application Ser. Nos. 11/610,289, 13/240,262, and 13/803,298. The disclosures of each of which are incorporated by reference in their entireties.

In step 335, the incentive may be offered to the customer using, for example, the customer's mobile device. Other manners of offering the incentive, including the merchant's point of sale device, may be used as is necessary and/or desired.

In step 340, the customer may accept the incentive, and the incentive may be applied. In one embodiment, the effectiveness of the incentive may be recorded to determine the attractiveness of the incentive. Based on this, the incentive may be revised or modified for future offerings.

In one embodiment, the rewards may be gamified. For example, additional incentives (e.g., additional reward points, free/discounted items, account badges, increased status or "rank," social media mentions, entry in a drawing/sweepstakes, etc.) may be offered to the customer for accepting the incentive for the current or a future transaction. For example, the acceptance of an incentive may lead to an increased incentive for the next transaction. As another example, the increased rewards may be used on the current transaction, may be redeemed for additional credit, etc.

In one embodiment, accepting a certain number of incentives within a certain time period may multiply account credit associated with the incentives. For example, if the customer accepts a certain number of offers within a certain time period, then the customer's account may be credited by an additional amount. Thus, if a customer accepts five offers that provide a total of $10 in account credit, the amount of the sixth offer may increase the total by $5.

In one embodiment, accepting an incentive may increase the customer's status or "rank." For example, a customer may be given a status or rank (e.g., bronze, silver, or gold; level 1-10; military ranks, etc.) for a certain time period. Customers with higher ranks may receive higher incentives, receive special or unique compensation, etc. than those having lower ranks.

In one embodiment, the additional incentives may be merchant and/or manufacturer specific. For example, a manufacturer may offer a manufacturer status or rank as opposed to an overall rank for the financial institution's rank. Thus, a customer may have different statuses/ranks with the financial institution, with the merchant, and/or with the manufacturer of the product. The back end may be aware of these different statuses/ranks and may offer additional incentives to the customer based on these ranks.

In one embodiment, one or more of the statuses/ranks may be associated with overall purchases and/or itemized purchases.

In one embodiment, if certain statuses/ranks are met for a certain time period, an incentive may be offered indefinitely for a specific manufactured item and/or specific merchant.

In one embodiment, the customer's payment history may be considered in offering an incentive, such a status/rank. For example, if a customer has regularly paid his or her credit card balance for last 12 months, he or she will receive an elevated member-status (gold-level, level 5, etc.) which may come with more preferable reward options.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for offering rewards to a customer of a financial institution, comprising:
 a server comprising at least one computer processor identifying a customer spending opportunity for a customer to use a specific financial instrument issued by a financial institution to conduct a transaction involving the customer spending opportunity comprising:

accessing customer financial data, via a data aggregating back-end system, wherein the financial data includes transaction history for the specific financial instrument as well as one or more of transaction history for the customer with a third-party financial account and merchant specific customer transaction history;

applying machine learning to the customer financial data to identify the customer's spending patterns and gaps in spending;

inferring, based on the machine learning analysis, that the customer is using a different financial instrument to conduct transactions in a particular category of goods or services, the identified customer spending opportunity existing within the particular category of goods or services, wherein the inferring is further based on global positioning system (GPS) technology and a lack of transactions with the specific financial instrument in the particular category of goods or services in which transactions are likely, and also on GPS technology;

the server determining a customer-personalized transaction-based incentive linked to the specific financial instrument to offer the customer for using the specific financial instrument issued by the financial institution to conduct the transaction involving the customer spending opportunity, wherein the customer-personalized transaction-based incentive is based on one or more of spending amount, spending category, spending patterns, geographic region, and the amount of time a customer spends in a store or a specific section of a store;

the server communicating the incentive to an electronic device associated with the customer;

the server receiving, from the electronic device, acceptance of the incentive; the server confirming that the transaction involving the customer spending opportunity was conducted using the specific financial instrument; and the server applying the incentive to the transaction.

2. The method of claim 1, wherein the server further identifies the customer spending opportunity by receiving, from a merchant, a notification that the electronic device associated with the customer is present at a merchant location, and the incentive is based on the customer conducting the transaction for a good or service offered for sale at the merchant location.

3. The method of claim 2, wherein the notification further comprises a location of the customer within the merchant location, and the incentive is based on the customer conducting the transaction for an item that is associated with the customer location within the merchant location.

4. The method of claim 1, wherein the server further identifies the customer spending opportunity by receiving, from the electronic device, location information for the electronic device indicating that the electronic device is present at a merchant location, and the incentive is based on the customer conducting the transaction for a good or service offered for sale at the merchant location.

5. The method of claim 1, wherein the server further identifies the customer spending opportunity by identifying an expected transaction for the customer that is not conducted with the financial institution's financial instrument, and the incentive is based the customer conducting the expected transaction.

6. The method of claim 5, wherein the expected transaction is based on transactions conducted by other financial institution customers using financial instruments issued by the financial institution.

7. The method of claim 1, wherein the incentive is specific to at least one of a merchant, a good or service, and a manufacturer.

8. A system for offering rewards comprising:
at least one merchant having a merchant location;
at least one financial institution; and
a back end comprising at least one computer processor, wherein the back end is configured to:
identify a customer spending opportunity for a customer to use a specific financial instrument issued by the financial institution to conduct a transaction involving the customer spending opportunity comprising:
accessing customer financial data, via a data aggregating back-end system, wherein the financial data includes transaction history for the specific financial instrument as well as one or more of transaction history for the customer with a third-party financial account and merchant specific customer transaction history;
applying machine learning to the customer financial data to identify the customer's spending patterns and gaps in spending; inferring, based on the machine learning analysis, that the customer is using a different financial instrument to conduct transactions in a particular category of goods or services, the identified customer spending opportunity existing within the particular category of goods or services, wherein the inferring is further based on GPS technology and a lack of transactions with the specific financial instrument in the particular category of goods or services in which transactions are likely;
determine "a customer-personalized transaction-based incentive linked to the specific financial instrument to offer the customer for using the specific financial instrument issued by the financial institution to conduct the transaction involving the customer spending opportunity, wherein the customer-personalized transaction-based incentive is based on one or more of spending amount, spending category, spending patterns, geographic region, and the amount of time a customer spends in a store or a specific section of a store;
communicate the incentive to an electronic device associated with the customer to conduct the transaction involving the customer spending opportunity;
receive, from the electronic device, acceptance of the incentive;
confirm that the transaction involving the customer spending opportunity was conducted using the specific financial instrument; and
apply the incentive to the transaction.

9. The system of claim 8, wherein the customer spending opportunity is further identified by the back end receiving, from a merchant, a notification that the electronic device associated with the customer is present at a merchant location, and the incentive is based on the customer conducting the transaction for a good or service offered for sale at the merchant location.

10. The system of claim 9, wherein the merchant location comprises at least one location determining device that detects the presence of the electronic device at the merchant location.

11. The system of claim 10, wherein the notification further comprises a location of the customer within the merchant location, and the incentive is based on a type of a good or service associated with the customer location.

12. The system of claim 9, wherein the electronic device comprises a location sensing device, and the back end further identifies the customer spending opportunity by receiving location information for the electronic device indicating that the electronic device is present at a merchant location from the electronic device, and the incentive is based on the customer conducting the transaction for a good or service offered for sale at the merchant location.

13. The system of claim 8, wherein the back end further identifies an expected transaction for the customer that is not conducted with the financial institution's financial instrument, and the incentive is based the customer conducting the expected transaction.

14. The system of claim 13, wherein the expected transaction is based on transactions conducted by other financial institution customers using financial instruments issued by the financial institution.

15. The system of claim 8, wherein the incentive to offer the customer for using the financial instrument issued by the first financial institution to conduct the transaction is specific to at least one of a merchant, a good or service, and a manufacturer.

16. A method for offering rewards to a customer of a financial institution, comprising: a server comprising retrieving, from a database, a plurality of transactions for goods and services conducted by a customer using a financial instrument issued by a financial institution over a first time period; the server identifying an expected transaction involving a good or service for the customer during the time period; the server determining that the plurality of transactions does not include the expected transaction; the server determining an incentive to offer the customer to use the financial instrument to conduct the expected transaction; the server communicating the incentive to an electronic device associated with the customer; the server receiving a transaction for the expected transaction; and the server applying the incentive to an account associated with the financial instrument.

17. The method of claim 16, wherein the expected transaction is based on at least one of a customer age and a customer income.

18. The method of claim 16, wherein the expected transaction is determined based on a transaction conducted with a financial instrument that is issued by a financial institution other than the financial institution.

* * * * *